United States Patent

Horiuchu et al.

[11] Patent Number: 5,472,233
[45] Date of Patent: Dec. 5, 1995

[54] AIR BAG DEVICE FOR PASSENGER SEAT

[75] Inventors: Noriyuki Horiuchu; Takashi Kato; Suzuaki Hongon; Hiroshi Ogawa, all of Aichi, Japan

[73] Assignee: Toyoda Gosei Co., Ltd., Aichi, Japan

[21] Appl. No.: 299,260

[22] Filed: Sep. 1, 1994

[30] Foreign Application Priority Data

Nov. 30, 1993 [JP] Japan ..................... 5-300374

[51] Int. Cl.⁶ ..................... B60R 21/16
[52] U.S. Cl. ..................... 280/743.1
[58] Field of Search ............ 280/728 R, 743 R, 280/730 R, 731, 732; 53/429, 116

[56] References Cited

U.S. PATENT DOCUMENTS

| | | | |
|---|---|---|---|
| 4,111,457 | 9/1978 | Kob et al. | 280/728 |
| 5,140,799 | 8/1992 | Satoh | 53/429 |
| 5,178,407 | 1/1993 | Kelley | 280/743 R |
| 5,275,435 | 1/1994 | Fischer | 280/743 R |
| 5,326,131 | 7/1994 | Yokota et al. | 280/743.1 |
| 5,342,087 | 8/1994 | Oda | 280/743 R |
| 5,398,968 | 3/1995 | Emambakhsh et al. | 280/732 |

Primary Examiner—Margaret A. Focarino
Assistant Examiner—Paul N. Dickson

[57] ABSTRACT

An air bag device for a passenger seat includes an air bag 1 stored in a folded state, an inflator 3, a case 5 for enclosing and storing the inflator 3 in the rear portion thereof and the air bag 1 in the front portion thereof respectively, and a cover member 7 for covering the front surface opening of the case. The case 5 further includes an air bag opening 6 in the horizontal direction thereof. The front portion of the air bag 1 defines a zigzag folded portion Z consisting of a plurality of folds respectively erected upwardly at the middle portions thereof along the extension of the lower side surface of the case 5 and the zigzag folded portion Z is then rolled up, and, in this state, the air bag 1 is stored in the case 5. Thereby, the air bag device for a passenger seat can reduce the number of folds of an air bag, and allows the air bag to be set into a case efficiently, and allows the air bag to be unfolded effectively.

4 Claims, 5 Drawing Sheets

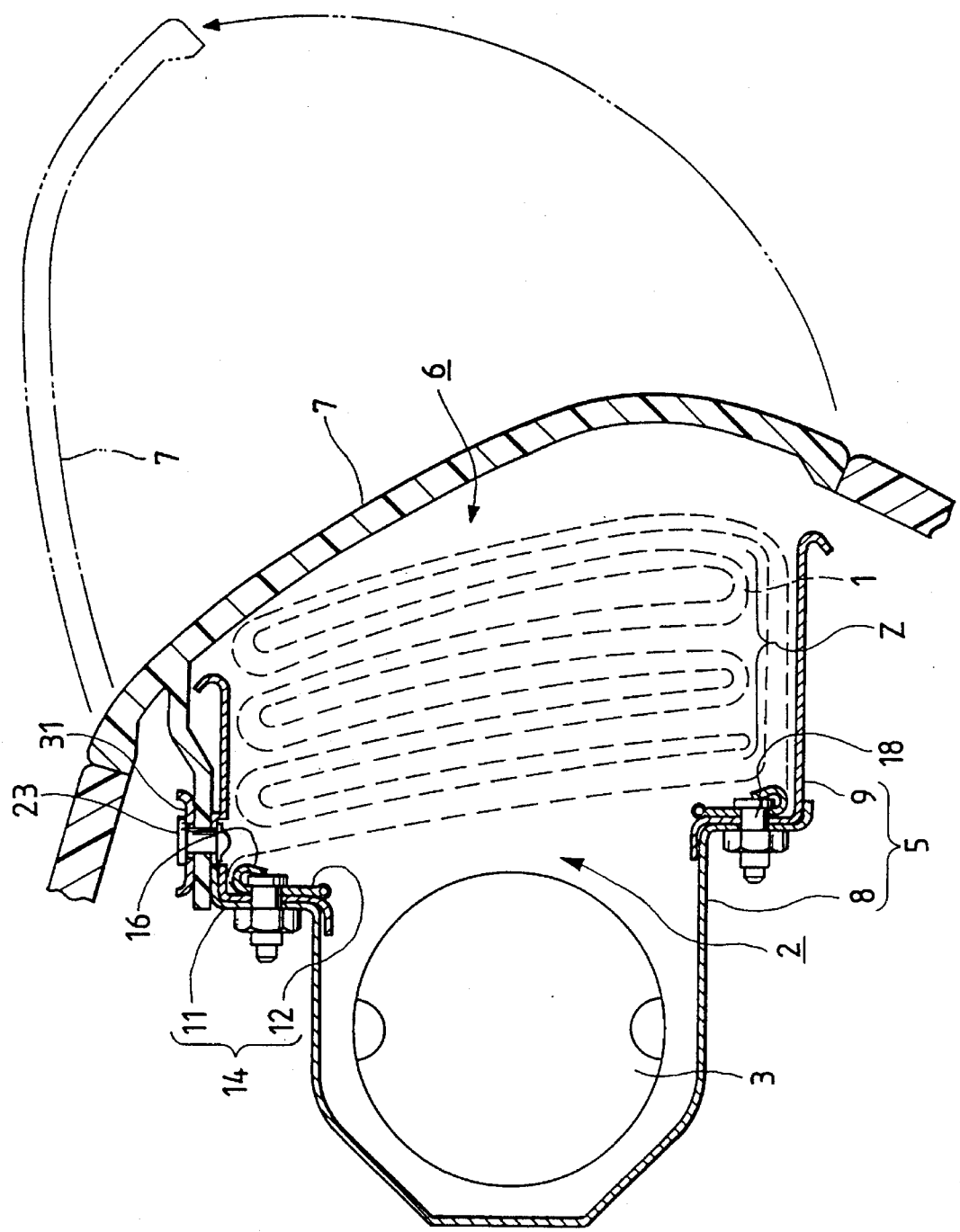

AIR BAG DEVICE FOR PASSENGER SEAT

BACKGROUND OF THE INVENTION

1. Field of Invention

The present invention relates to an air bag device for a seat next to a driver, namely, a passenger seat and, in more particularly, to an air bag device for a passenger seat which includes an air bag stored in a folded state and having a gas inlet port, an inflator for feeding gas to the air bag, a case for enclosing and storing the inflator in the rear portion thereof and the air bag in the front portion thereof, and a cover member for covering the front surface opening of the case. The case further includes an air bag opening in the horizontal direction thereof (that is, when unfolded, the air bag can be projected out from the air bag opening towards a passenger).

2. Description of Related Art

In FIG. 1, there is shown an example of a conventional air bag device for a passenger seat.

The conventional air bag device comprises an air bag 1 which is stored in a folded state and includes a rectangular gas inflow opening 2, an inflator 3 for feeding gas to the air bag 1, a case 5 for enclosing and storing the inflator 3 in the rear portion thereof, and the air bag 1 in the front portion thereof, and a cover member 7 for covering the front surface of the case 5. The case 5 includes an air bag opening in the horizontal direction thereof.

In the illustrated conventional air bag device, the case 5 is divided into two parts; that is, a rear case 8 for storing the inflator 3 and a front case 9 for storing the air bag 1. In order to connect the rear and front cases to each other, there is provided a mounting flange 14 which includes an outer flange 11 and an inner flange 12 respectively provided in the rear and front cases. The air bag 1 is mounted in such a manner that it is bolted or riveted (in the illustrated case, it is fixed by bolts 18) to a mounting flange 14 through a rectangular ring retainer 16.

The air bag 1, when stored, as shown in FIG. 1, is in a zigzag, folded condition. That is, the air bag 1 is a so called bellows-type airbag.

However, in the above-mentioned bellows-type air bag, since the air bag is folded from the base portion thereof to the last portion thereof, the number of the zigzag folds is large and a man-hours required for folding the air bag is relatively great. Also, when the air bag is foldedly stored, in order to maintain the thick fold state (zigzag fold state) of the air bag, it is necessary to store the air bag into the case while holding the entire air bag by hand, which means that the air bag cannot be set into the case efficiently.

Also, when the air bag is unfolded, the air bag is liable to unfold downwardly of a horizontal direction due to gravity (due to its own weight). As a result, the air bag at first reaches the lap portion of a passenger and, thereafter, it arrives at the breasts portion of the passenger. Therefore, the conventional air bag cannot always offer an effective unfolding characteristic, namely, it cannot efficiently absorb shock

SUMMARY OF THE INVENTION

The present invention aims at eliminating the drawbacks found in the conventional air bag device. Accordingly, it is an object of the invention to provide an air bag device for a passenger seat which can reduce the number of folds of an air bag, can facilitate the setting of the air bag into a case, and can provide a good air bag unfolding characteristic.

The air bag device for a passenger seat according to the invention solves the above-mentioned problems by use of the following structure.

That is, in attaining the above object, according to the invention, there is provided an air bag device for a passenger seat including an air bag stored in a folded state and having a gas inflow opening, an inflator for feeding gas to the air bag, a case for enclosing and storing the inflator in the rear portion thereof and the air bag in the front portion thereof, and a cover member for covering the front surface opening of the case. The case further includes an air bag opening in the horizontal direction thereof. The front portion of the air bag defines a zigzag folded portion consisting of a plurality of folds which are respectively erected upwardly at the middle portions thereof along the extension of the lower side surface of the case. The zigzag folded portion is further rolled-up counterclockwise about 180° and thereafter, in this state, the air bag is stored in the case.

The air bag device for a passenger seat according to the invention provides the following operation and effects by means of the above-mentioned structure.

(1) Because the air bag is stored in the case in such a manner that the front portion of the air bag defines a zigzag folded portion erected upwardly at the middle portions thereof along the extension of the lower side surface of the case and the zigzag folded portion is rolled-up about 180°, the present invention can reduce the number of folds as compared to the conventional air bag device. Also, since the air bag, which is stored into the case after holding and rolling-up the zigzag folded portion by hand, is thinner than the conventional air bag, the air bag can be set into the case efficiently.

(2) In unfolding the air bag, when the air flow removes the roll-up of the zigzag folded portion and reaches the starting point of the zigzag folded portion, since the zigzag folded portion is erected upwardly at the start point thereof, the gas or air flow in the air bag acts upwardly at the start point of the zigzag folded portion. Thus, the unfolding direction of the air bag is corrected upwardly and the air bag unfolds substantially in a horizontal direction. For this reason, the air bag is allowed to reach the breasts portion of the passenger first, that is, the unfolding characteristic of the air bag is improved.

BRIEF DESCRIPTION OF THE DRAWINGS

FIG. 2 is a schematic sectional view of an embodiment of an air bag device according to the invention;

DETAILED DESCRIPTION OF PREFERRED EMBODIMENT

Description will be given below of an embodiment of an air bag device according to the invention with reference to the accompanying drawings. In the illustrated embodiment, the same parts as those shown in the above-mentioned conventional air bag device are given the same designations and the description thereof is omitted here wholly or in part.

Figure 1:
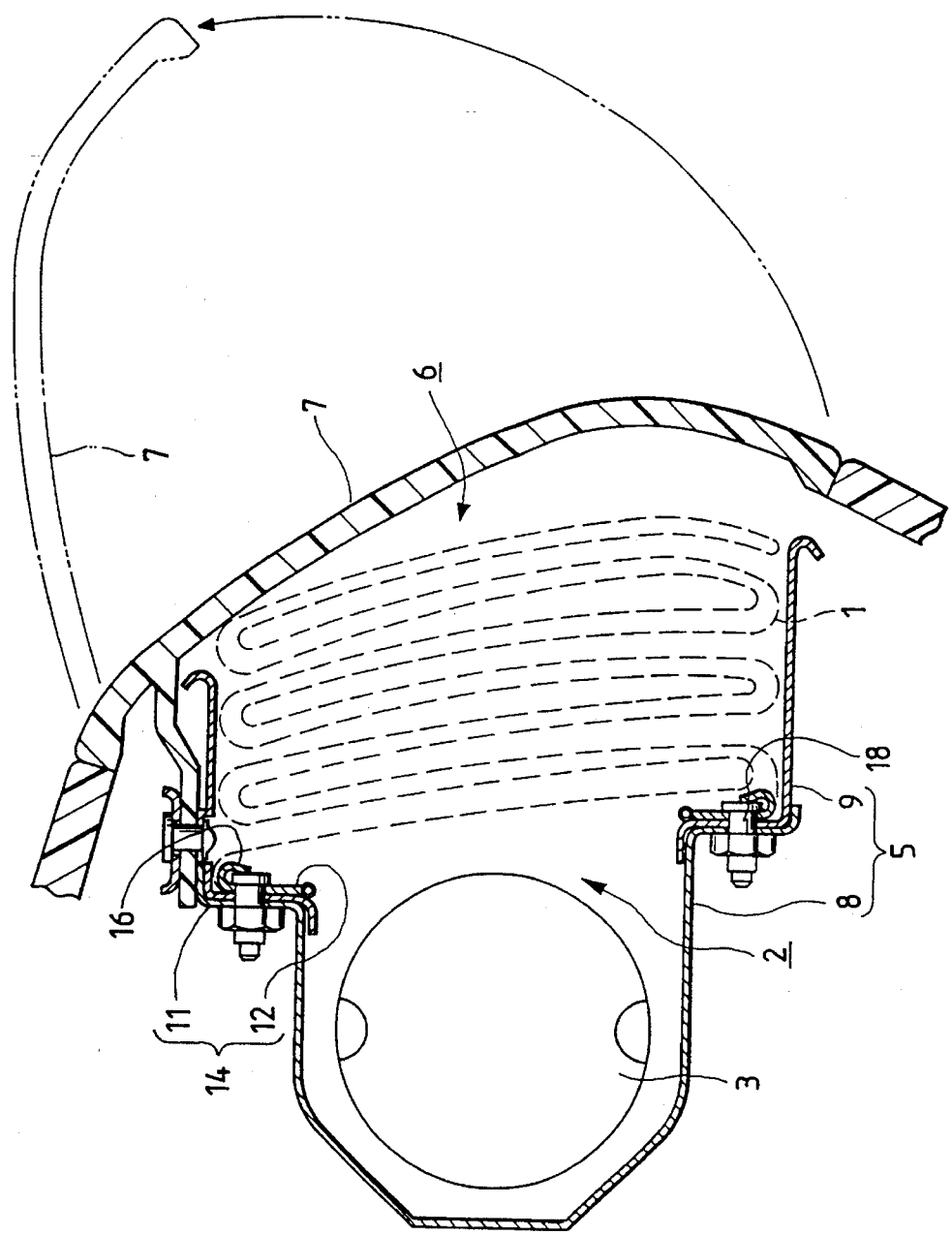
FIG. 1 is a schematic sectional view of an example of a conventional air bag device.

An air bag device according to the present embodiment has the following structure in common with the conventional air bag device shown in FIG. 1.

That is, the present air bag device includes an air bag 1 stored in a folded state and having a rectangular gas inflow opening 2, an inflator 3 for feeding gas to the air bag 1, a case 5 enclosing the inflator 3 and air bag 1. The device includes a mounting flange 14 for mounting the air bag 1 thereto, a rectangular ring retainer 16 for mounting the air bag 1 onto the mounting flange 14, and a cover member 7 for covering the front surface opening of the case 5.

In the present embodiment, as shown in FIG. 2, the front portion of the air bag 1 defines a zigzag folded portion Z consisting of a plurality of alternating and adjacent folds respectively erected from the middle portions thereof along the extension of the lower side surface 9a of a front case 9. The zigzag folded portion Z is further rolled-up about 180°; that is, in this state, the air bag 1 is stored in the front case 9. The air bag is folded in such an order as shown in FIG. 3.

Figure 3A:
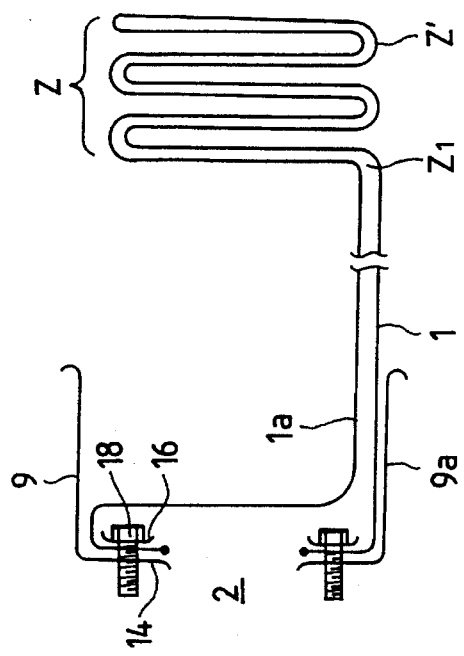
FIGS. 3A to 3D show schematically a procedure in folding an air bag and storing the folded air bag in a case in an embodiment according to the invention.

A ring retainer 16 is firstly guided under the rectangular gas inflow opening of the air bag 1 and is then disposed at the back side of the mounting base portion of the air bag. The ring retainer 16 and mounting flange portion 14 are used to hold the bag mounting base portion of the air bag 1 therebetween and the air bag mounting base portion is fixed by use of a screw or bolt 18. Thereafter, the air bag 1 is extended along the lower side surface 9a of the front case 9 as shown in FIG. 3A.

Figure 3B:
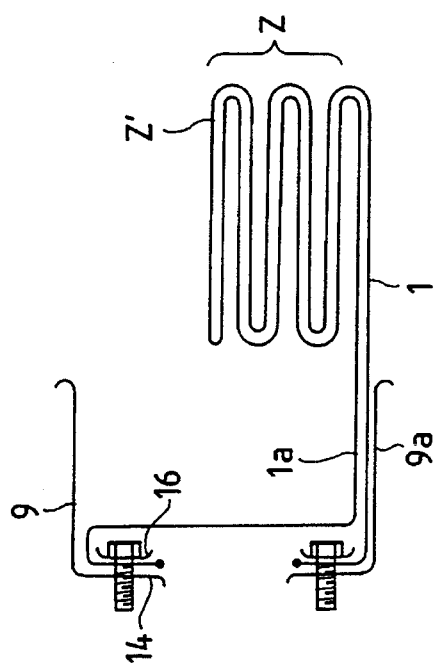

Next, there is left an extending portion 1a of the rear portion of the air bag 1 that allows the remaining portion (a zigzag folded front portion to be described here-below) to rolled-up thereon. Thus, the front portion of the air bag 1 is folded in a zigzag manner sequentially starting at the leading end portion thereof to thereby define a zigzag folded portion Z including a plurality of folds Z' as shown in FIG. 3B.

Figure 3C:
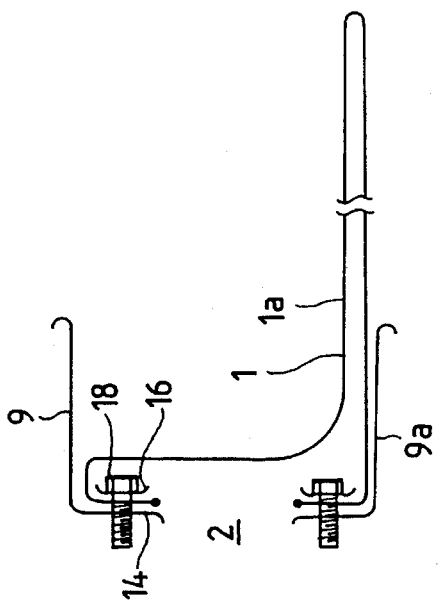
Figure 3D:
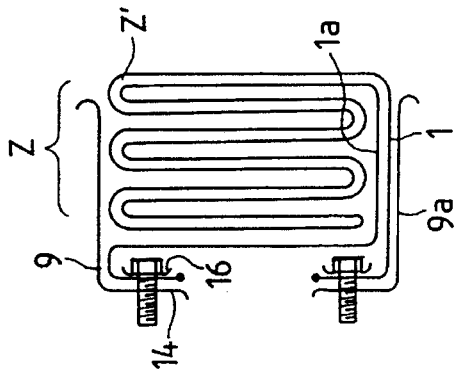

Next, the zigzag folded portion Z is rolled downwardly towards the front case 9 as shown in FIG. 3C so that the folds Z' are generally horizontal and parallel to extending portion 1a. Next, folded portion Z is erected in an upward direction as shown in FIG. 3D, whereby the zigzag folded portion Z is rolled-up about 180° on the extending portion 1a of the air bag 1. In this state, the air bag 1 is stored into the front case 9. Thus, the folds Z' of the zigzag folded portion Z are disposed vertically and transversely with respect to extending portion 1a, along the lower side surface 9a of the front case 9.

After the air bag 1 is stored in the front case 9 in this manner, the cover member 7 is mounted through a mounting bar 31 to the case by means of a rivet 23 or the like as shown in FIG. 2.

Figure 4:
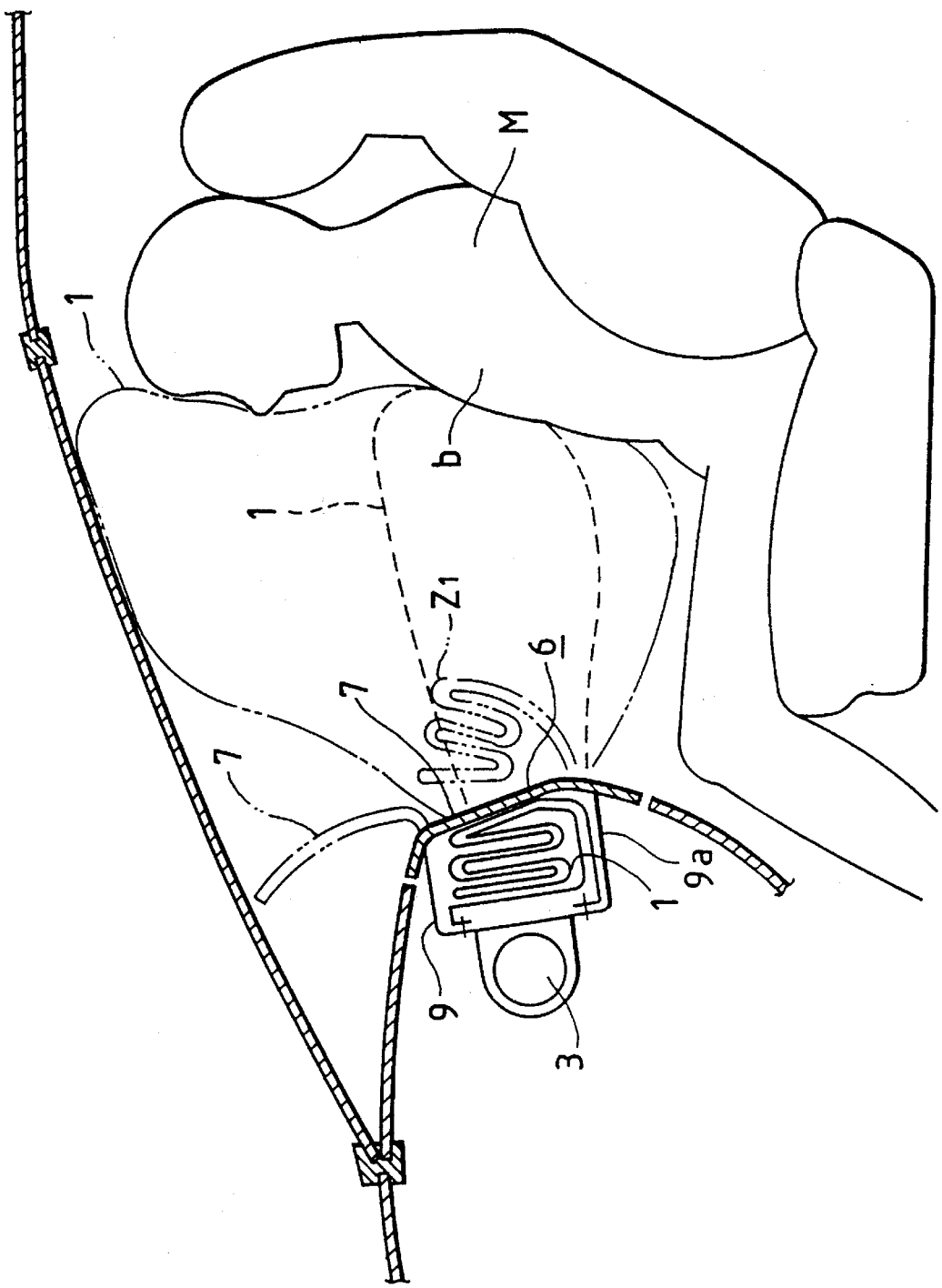
FIG. 4 is a model unfolding view of an air bag employed in the embodiment shown in FIG. 2.

Next, description will be given below of the operation of the above-mentioned embodiment referring with to FIG. 4.

When a given shock load is applied to a vehicle body, the inflator 3 is operated responsive to a shock detect signal from shock detect means (not shown), so that gas is generated explosively from a gas generator provided in the inflator 3. The gas generated from the inflator 3 flows into the air bag 1. At the same time, the cover member 7 experiences the inflating force of an air bag main body 17 and is thus rotated upwardly, so that the air bag opening is caused to open.

At that time, since the air bag 1 is stored in such a manner that its front zigzag folded portion Z is rolled up about 180° at first, the kinetic energy of the gas flow is used mainly to unroll the rolled up zigzag folded portion Z. Next, when the gas flow arrives at the start point $Z_1$ of the zigzag folded portion Z, since the zigzag folded portion Z is erected upwardly at the start point $Z_1$ as shown in FIG. 3B, the gas flow in the air bag 1 acts upwardly to thereby correct the unfolding direction of the air bag 1 upwardly. That is, while the air bag 1 is normally unfolded downwardly of the horizontal direction due to gravity (its own weight), the upward action of the gas flow corrects the unfolding direction upwardly. Thus, as shown in FIG. 4, at first, the air bag 1 is unfolded towards the breasts portion b of a passenger M, as shown by a dotted line to protect the breasts portion b and, after then, the air bag 1 is unfolded about the breasts portion b as shown by a two-dot chained line. Therefore, the unfolding air bag has an increased effect on the absorption of the shocks given to the passenger.

For reference, the present inventors conducted tests of the air bag device according to the present embodiment and an air bag device (a comparison example) in which an air bag is turned upside down (the zigzag folded portion is rolled down) in the present embodiment, in accordance with the F-MVSS (Motor Vehicle Safety Standard).

In this tests, speed pictures (frame pictures) were taken. These speed pictures show that, in the comparison example, the unfolding direction of the air bag was a downward direction (a direction toward the lap portion of the passenger), whereas in the present embodiment the unfolding direction of the air bag was substantially a horizontal direction.

Figure 5:
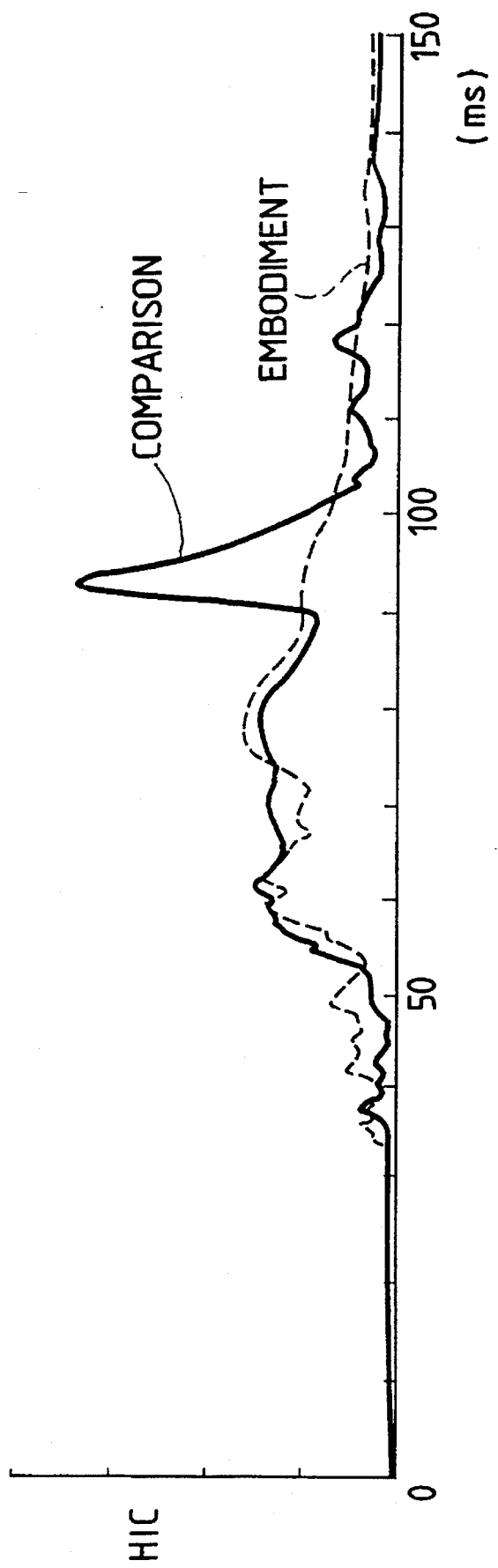
FIG. 5 is a graphical representation of a difference in the HIC values of a passenger's head in a test between the present embodiment and a comparison example.

Referring now to a graphical representation of the HIC (Head Injury Criterion) values of the head of the passenger (FIG. 5), in the comparison example, a great load peak occurred, whereas such load peak did not occur in the present embodiment. This also shows that the air bag device according to the present embodiment is improved in the unfolding characteristic of the air bag over the comparison example.

Thus, it has been seen that the objects of this invention have been fully and effectively accomplished. It will be realized, however, that the foregoing preferred embodiment of the present invention has been shown and described for the purpose of illustrating the structural and functional principles of the present invention and is subject to change without departure from such principles. Therefore, this invention includes all modifications encompassed within the spirit of the following claims.

What is claimed is:

1. An air bag device for a passenger seat comprising:

an air bag arranged in a folded state and including a gas inflow opening;

an inflator for feeding gas to the air bag through the gas inflow opening;

a case for enclosing and storing the inflator in a rear portion thereof and the air bag in a front portion thereof, said case having a front surface opening extending in a horizontal direction; and a cover member for covering the front surface opening of the case, said cover member being constructed and arranged to open upon inflation of the air bag;

wherein said air bag is constructed and arranged within said case such that a front portion of said air bag defines a zigzag folded portion consisting of a plurality of alternating and adjacent folds respectively erected upwardly and a rear portion of the air bag extends along a mounting base portion of the air bag and a lower side surface of the case, said zigzag folded portion being disposed transversely with respect to the rear portion of the air bag which extends along the lower side surface of said case, the mounting base portion of the air bag being affixed to said case adjacent said rear portion of said air bag.

2. An air bag device for a passenger seat as claimed in claim 1, wherein said case is divided into a rear case for storing the inflator and a front case for storing the air bag, each of the rear case and the front case has a flange portion to connect together the front case and the rear case, said mounting base portion being coupled to said flange portions.

3. An air bag device comprising:

- an air bag arranged in a folded state and including a gas inflow opening;
- an inflator for feeding gas to the air bag through the gas inflow opening;
- a case constructed and arranged to enclose and store the inflator in a rear portion thereof and the air bag in a front portion thereof, said case having a front surface opening extending in a horizontal direction;
- a cover member for covering the front surface opening of the case, said cover member being constructed and arranged to open upon inflation of the air bag;
- wherein said air bag is constructed and arranged within said case such that a front portion of said air bag defines a zigzag folded portion consisting of a plurality of alternating and adjacent folds respectively erected upwardly and a rear portion of the air bag extends along a mounting base portion of the air bag and a lower side surface of the case, said zigzag folded portion being disposed transversely with respect to the rear portion of the air bag which extends along the lower side surface of said case whereby upon inflation of the air bag a gravitational effect on the inflating air bag tending to force the air bag downwardly upon exiting the air bag opening is overcome enabling the air bag to unfold substantially horizontally.

4. A method of storing an air bag in a case of an air bag device comprising the step of:

- mounting a base portion of the air bag to the case;
- folding a front portion of the air bag to define a zigzag folded portion having alternating and adjacent folds, and arranging a rear portion of the air bag to extend along said base portion of the air bag and a lower side surface of said case, said folds being disposed generally horizontal and parallel with respect to the rear portion of the air bag extending along said base portion; and
- moving said folded portion such that said folds are disposed generally vertically and transversely with respect to said rear portion of said air bag extending along the lower side surface of said case.

* * * * *